United States Patent [19]
Hayakawa et al.

[11] Patent Number: 5,644,449
[45] Date of Patent: Jul. 1, 1997

[54] MAGNETIC HEAD SLIDER ASSEMBLY

[75] Inventors: Yuichi Hayakawa, Tokyo; Atsushi Hirano, Gunma; Yasuhiro Miyata, Gunma; Koki Takahashi, Gunma, all of Japan

[73] Assignee: NEC Corporation, Tokyo, Japan

[21] Appl. No.: 631,120

[22] Filed: Apr. 12, 1996

Related U.S. Application Data

[63] Continuation of Ser. No. 111,951, Aug. 26, 1993, abandoned.

[30] Foreign Application Priority Data

Aug. 28, 1992 [JP] Japan .................. 4-229511

[51] Int. Cl.⁶ .................................................. G11B 5/60
[52] U.S. Cl. ............................................................ 360/103
[58] Field of Search ..................................... 360/103, 104

[56] References Cited

FOREIGN PATENT DOCUMENTS

| | | | |
|---|---|---|---|
| 55-122265 | 9/1980 | Japan | 360/103 |
| 59-178647 | 10/1984 | Japan | 360/103 |
| 61-115271 | 6/1986 | Japan | 360/103 |
| 62-159329 | 7/1987 | Japan | 360/103 |
| 63-152015 | 6/1988 | Japan | 360/103 |
| 63-152016 | 6/1988 | Japan . | |
| 2-40124 | 2/1990 | Japan | 360/103 |
| 2-146148 | 6/1990 | Japan | 360/104 |
| 4-186574 | 7/1992 | Japan | 360/103 |
| 5-120825 | 5/1993 | Japan | 360/103 |
| 5-128466 | 5/1993 | Japan | 360/103 |
| 6-5030 | 1/1994 | Japan | 360/103 A |
| 6-175620 | 6/1994 | Japan | 360/103 |

*Primary Examiner*—Stuart S. Levy
*Assistant Examiner*—Allen Cao
*Attorney, Agent, or Firm*—Sughrue, Mion, Zinn, Macpeak & Seas

[57] ABSTRACT

A magnetic head slider assembly for a magnetic recording and reproducing apparatus. A first slide surface and a second slide surface, which are comparatively wide, are formed on the surface of the assembly which will face a recording medium. A first air groove intervenes between the first and second slide surfaces. Part of the first slide surface is formed by a magnetic core. A third slide surface adjoins the first slide surface via a second air groove at the side opposite to the first air groove. The third slide surface is slightly remoter from the medium than the first and second slide surfaces.

6 Claims, 6 Drawing Sheets

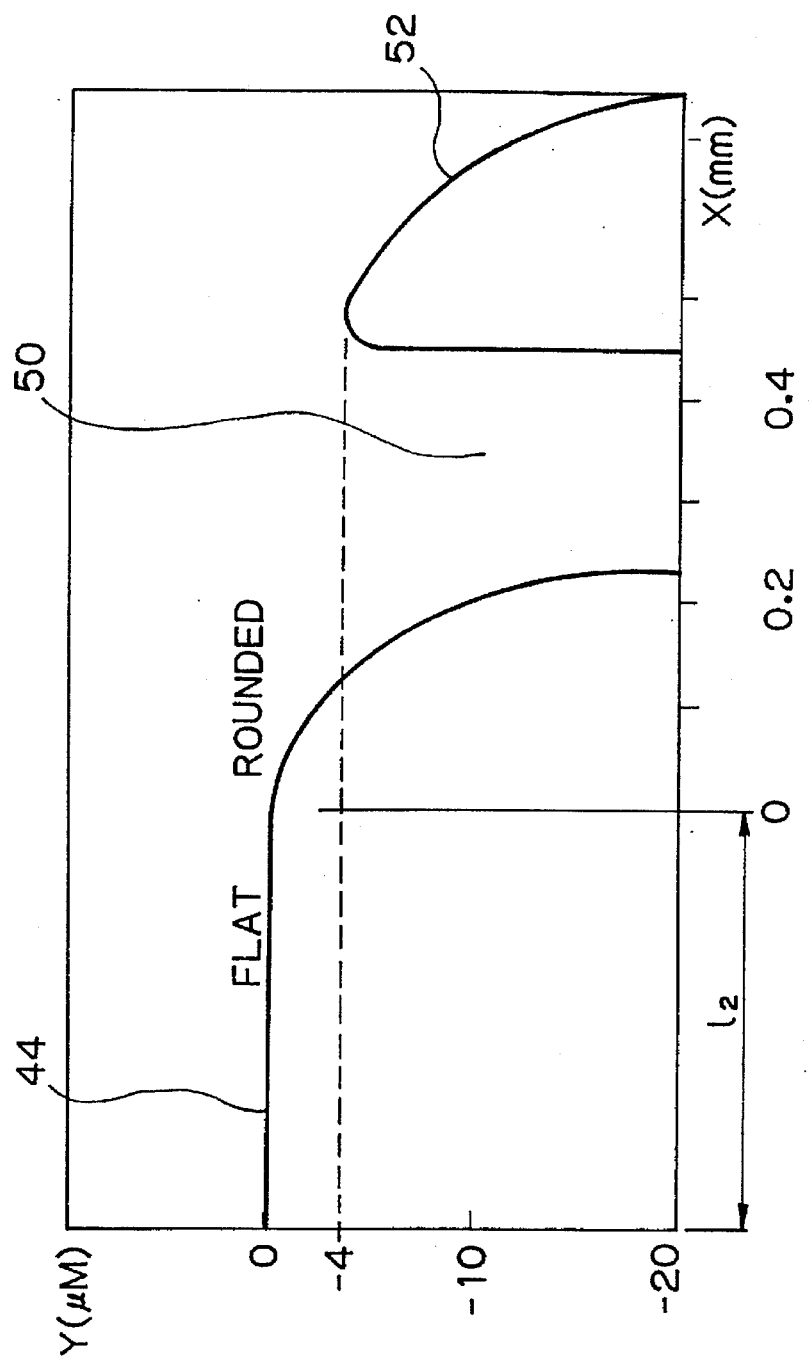

5,644,449

MAGNETIC HEAD SLIDER ASSEMBLY

This is a continuation of application Ser. No. 08/111,951 filed Aug. 26, 1993 now abandoned.

BACKGROUND OF THE INVENTION

The present invention relates to a magnetic head for recording and reproducing data out of a magnetic recording medium and, more particularly, to a magnetic head slider assembly applicable to a floppy disk drive.

It is a common practice with a floppy disk drive to use a magnetic head slider assembly made up of a magnetic core and opposed non magnetic sliders holding the core therebetween. The surface of the assembly which faces a recording medium, i.e., a floppy disk is provided with a single air groove and two slide surfaces sandwiching the groove. Since the slide surfaces contact a disk and, therefore, directly influence a recording and reproducing characteristic, they have to meet some requisites, as follows. To begin with, the slide surfaces should be provided with extremely high flatness to reduce the separation loss of magnetic gap and disk. Further, the slide surfaces should each be as narrow as possible; should the area be great, they would face a disk over a greater area to increase the floating amount of the assembly, thereby aggravating the spacing loss. In addition, to protect the surface of a disk from damage, the edges of the slide surfaces have to be slowly rounded.

However, it is extremely difficult for the conventional slider assembly to be so configured as to satisfy the above various conditions at the same time, particularly to protect the disk from damage and reduce the spacing loss at the same time.

SUMMARY OF THE INVENTION

It is, therefore, an object of the present invention to provide a magnetic head slider assembly which brings about a minimum of spacing loss and does not damage a recording medium.

A magnetic head slider assembly for a magnetic recording apparatus capable of recording and reproducing data out of a magnetic recording medium of the present invention comprises a magnetic core extending in an intended direction of movement of the recording medium, a first and a second slider holding the magnetic core therebetween, a fist slide surface facing the recording medium and formed by part of the first slider, the magnetic core, and part of the second slider, a second slide surface facing the recording medium and spaced from the first slide surface, and a third slide surface facing the recording medium and spaced from the first slide surface at a position opposite to the second slide surface. The third slide surface is remoter from the recording medium than the first and second slide surfaces.

BRIEF DESCRIPTION OF THE DRAWINGS

The above and other objects, features and advantages of the present invention will become more apparent from the following detailed description taken with the accompanying drawings in which:

FIG. 6 is a view representative of the dimensions of slide surface and groove included in each of the embodiments.

DESCRIPTION OF THE PREFERRED EMBODIMENTS

Figure 1:
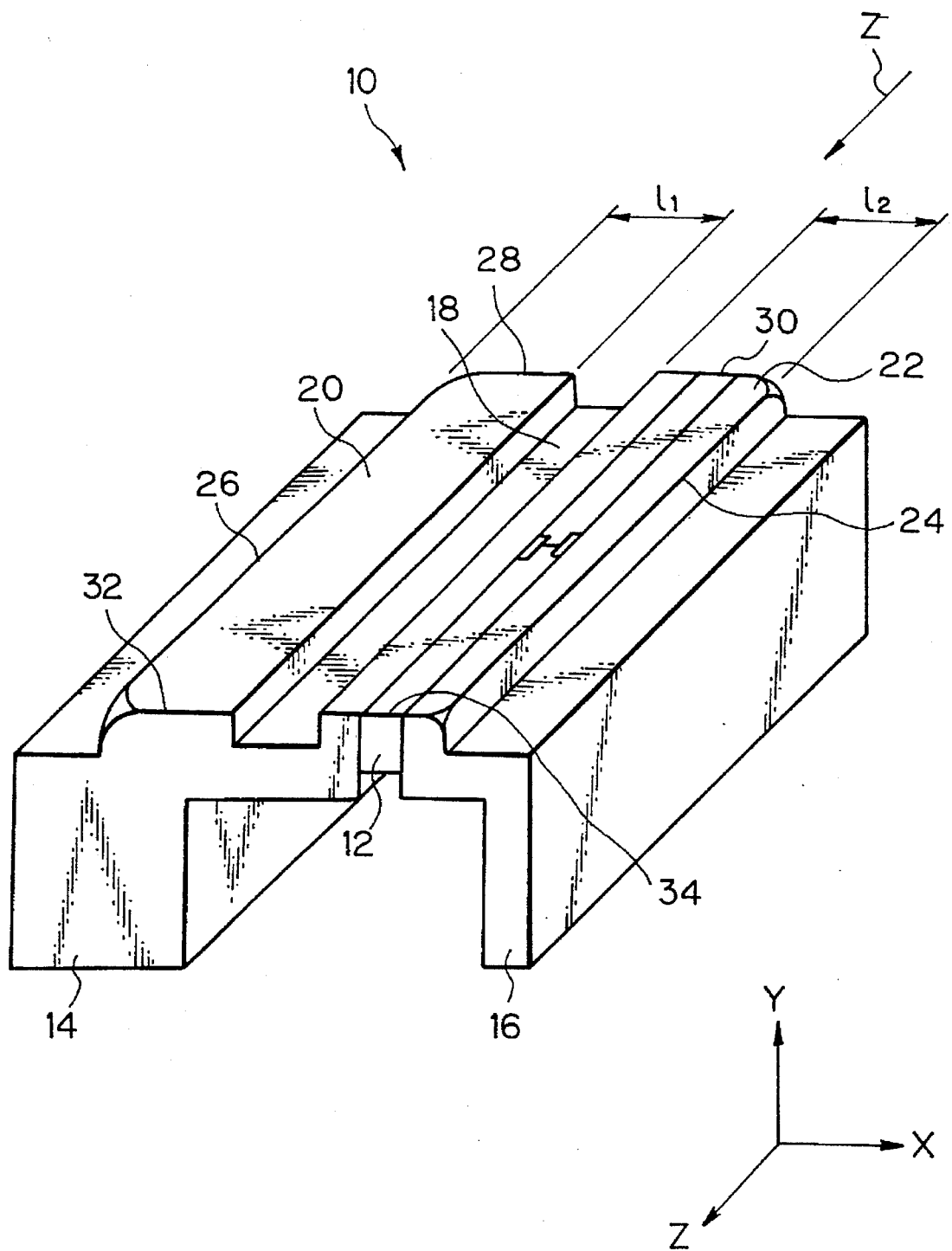
FIG. 1 is an external perspective view of a conventional magnetic head slider assembly.

To better understand the present invention, a brief reference will be made to a conventional magnetic head slider assembly, shown in FIG. 1. As shown, the slider assembly, generally 10, has a magnetic core 12 and a first and a second nonmagnetic slider 14 and 16 supporting opposite sides of the core 12. The slider assembly 10 is provided with a single air groove 18 and two slide surfaces 20 and 22 on the surface thereof which faces a floppy disk or recording medium, not shown. Since the disk contacts the slide surfaces 20 and 22, the previously stated three requisites have to be met. Specifically, the slide surfaces 20 and 22 have to have extremely high flatness (first requisite) and as small an area as possible (second requisite) and have to have their edges 24, 26, 28, 30, 32 and 34 slowly rounded (third requisite). However, it is extremely difficult to fabricate the slider assembly 10 in such a manner as to meet all of the three requisites.

Figure 2A:
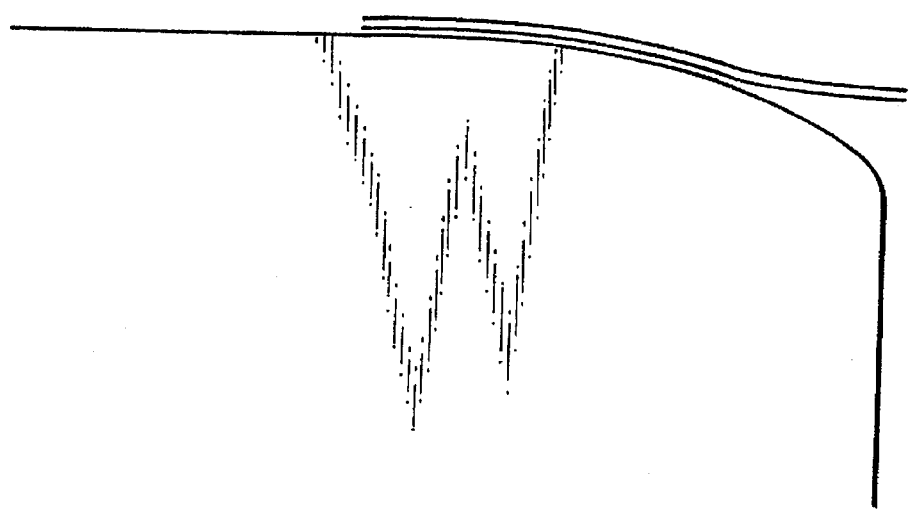
FIGS. 2A and 2B are fragmentary sections each showing a specific conventional slide surface configuration included in the assembly of FIG. 1.
Figure 2B:
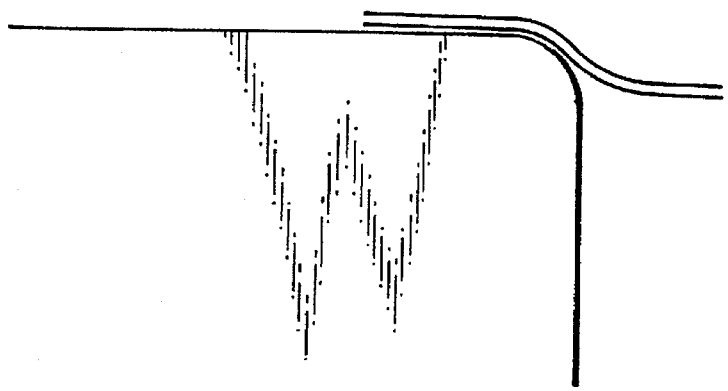

For example, assume that the edges 24-34 of the slide surfaces 20 and 22 are each slowly rounded, as sown in FIG. 2A. Although such a configuration meets the third requisite, i.e., protects the disk from damage, the edges defining the widths 11 and 12, FIG. 1, of the slide surfaces 20 and 22 are indefinite, More specifically, since the rounding degree is small, the irregularity in rounding is apt to appear in the widths 11 and 12 with the result that the spacing loss is irregular. On the other hand, when the decrease in area (second requisite) is taken into consideration, the slow rounding extends as far as or to the neighborhood of the magnetic core 12. This reduce the flatness (first requisite) and, therefore, aggravates the spacing loss. Assume that the edges 24-34 are each acutely rounded, as shown in FIG. 2B. Then, the edges are apt to damage the disk although they implement high flatness and definite widths 11 and 12. Consequently, it is difficult for the conventional slider assembly 10 to protect the disk from damage and reduce the spacing loss at the same time.

Figure 3:
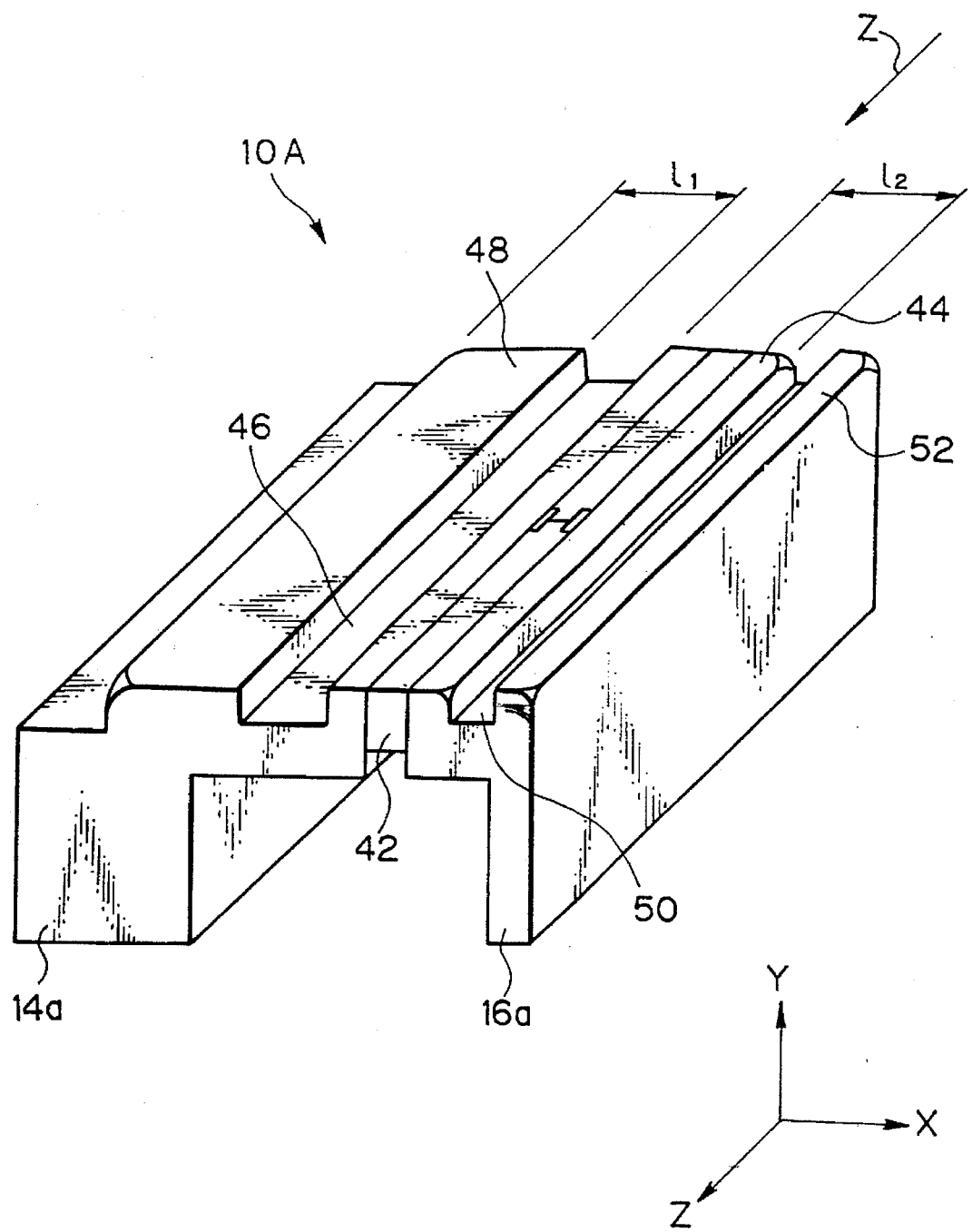
FIG. 3 is an external perspective view of a magnetic head slider assembly embodying the present invention.

Referring to FIG. 3 of the drawings, a magnetic head slider assembly embodying the present invention will be described. As shown, the slider assembly, generally 10A, has a magnetic core 42 extending in a direction Z in which a floppy disk, or recording medium, runs. The core 42 is supported by a first and a second slider 14a and 16a at opposite sides thereof. Part of the slider 14a, core 42, and part of the slider 16a form a first slide surface 44 in combination. An air groove 46 is formed at one side of the first slide surface 44, and a second slide surface 48 is located next to the air groove 46. A second air groove 50 adjoins the other side of the first slide surface 44 while a third slide surface 52 adjoins the air groove 50. The first and second slide surfaces 44 and 48 are positioned at the same level, or height, as each other. However, the third slide surface 52 is slightly lower in level than the slide surfaces 44 and 48 and will be spaced apart from a disk.

The third slide surface 52 will be described specifically with reference to FIGS. 4A and 4B. As shown, the edge of the slide surface 52 is rounded more slowly than the edge of the first slide surface 44 which faces the second air groove 50. Further, the slide surface 52 is lower in level than the slide surface 44 by Δt.

Figure 4A:
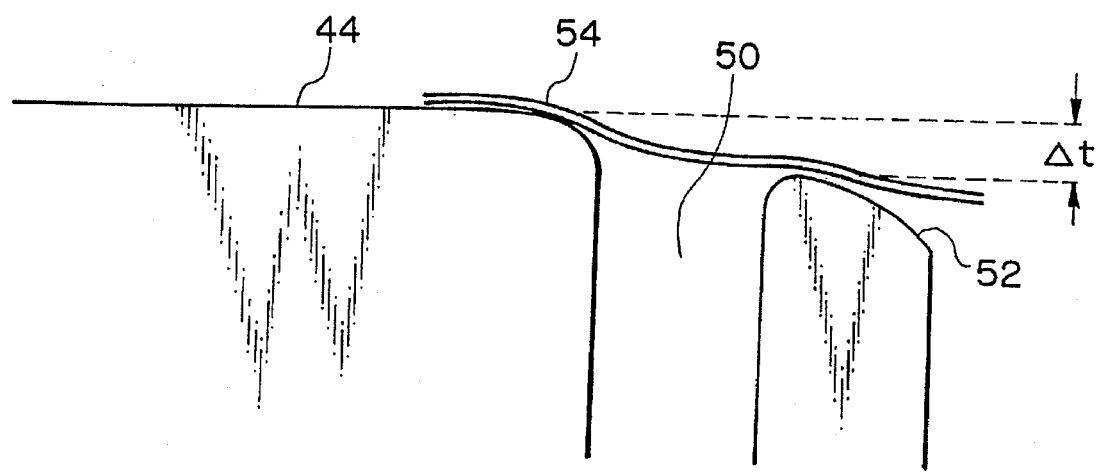
FIGS. 4A and 4B are fragmentary sections showing slide surfaces included in the embodiment.
Figure 4B:
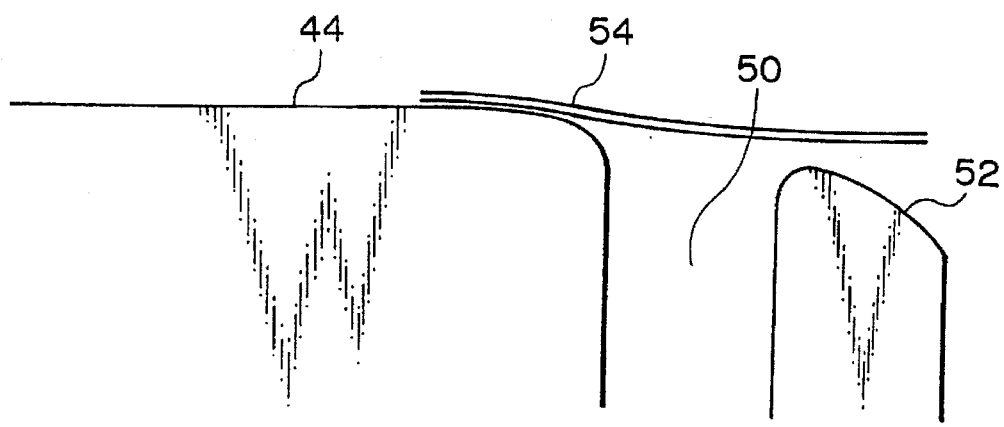

FIG. 4A indicates a condition in which a disk 54 has just started spinning at a low speed. In this condition, the disk 54 remains in contact with both of the slide surfaces 44 and 52. The slide surface 52 prevents the disk 54 from being sharply bent by the edge of the slide surface 44. Therefore, the disk 54 is protected from damage despite the acute rounding of the slide surface 44. On the other hand, while the disk 54 is in steady rotation, it generates a stream of air which, in turn, generates a positive pressure on the slide surfaces 44 and 52. The positive pressure urges the slider assembly 54 away from the disk 54 with the result that the slide surface 52 and disk 54 are spaced apart from each other, as shown in FIG. 4B. Consequently, the previously stated spacing loss effects only the slide surface 44 (in practice, second slide surface 48 as well). This successfully reduces the spacing loss since the slide surface 44 is acutely rounded and provided with an accurate and definite area.

Figure 5:
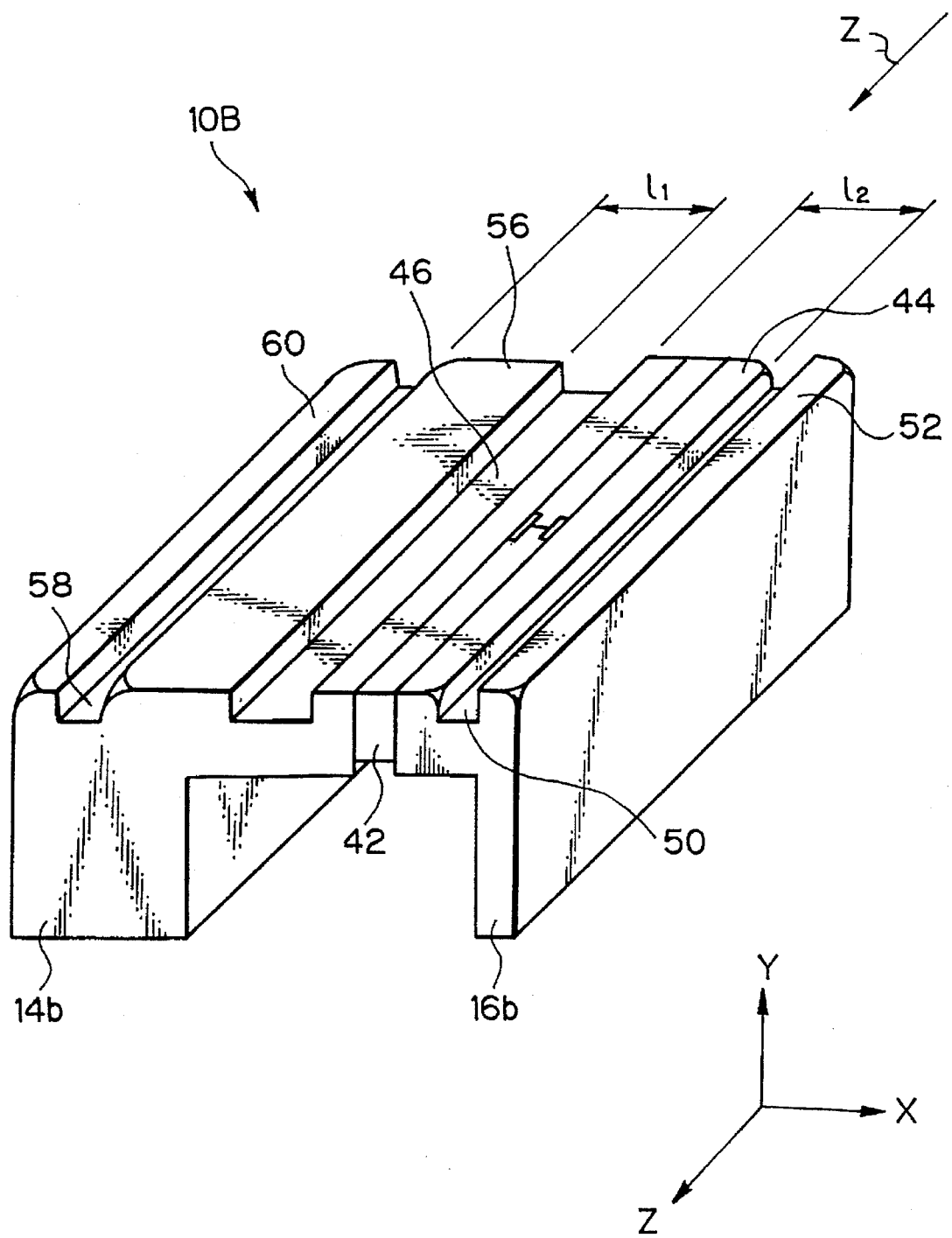
FIG. 5 is an external perspective view showing an alternative embodiment of the present invention.

FIG. 5 shows an alternative embodiment of the present invention which is essentially similar to the previous embodiment except for the following. As shown, a magnetic head slider assembly 10B includes the slide surface 44 and a slide surface 56 provided at both sides of the first air groove 46, the slide surface 44 supporting the core 42. The slide surface 52 and a slide surface 60 are respectively positioned at the outside of the slide surfaces 44 and 56 via the second air groove 50 and a third air groove 58.

With the slider assembly 10B, it is possible to accurately define not only the width 12 of the slide surface 44 but also the width 11 of the slide surface 56. This is successful in implementing a recording and reproducing characteristic even stabler than one achievable with the previous embodiment.

A reference will be made to FIG. 6 for describing the dimensions of the portion shown in FIGS. 4A and 4B specifically. It should be noted that the dimensions of FIG. 6 are only illustrative and not limitative. As shown, the difference in level Δt between the slide surfaces 44 and 52 is 4 microns. The air groove 50 is about 0.2 millimeter wide. The slide surface 52 is 0.45 millimeter to 0.5 millimeter spaced apart from the boundary between the flat portion and the rounded portion of the slide surface 44. In practice, the allowable difference in level Δt between the slide surfaces 44 and 52 is about 0.1 micron to about 50 microns. Differences Δt smaller than 0.1 microns would not provide an effective step, while differences Δt greater than 50 microns would make the slide surface 52 useless and would simply result in a conventional slider configuration. The width of the air groove 50 is selectable over a broad range.

In summary, it will be seen that the present invention provides a magnetic head slider assembly which stably reduces a separation loss and protects a recording medium from damage.

Various modifications will become possible for those skilled in the art after receiving the teachings of the present disclosure without departing From the scope thereof.

What is claimed is:

1. A magnetic head slider assembly for a magnetic recording apparatus for recording and reproducing data out of a magnetic recording medium, said assembly comprising:

a magnetic core extending in an intended direction of movement of the recording medium;

a slider holding said magnetic core, said slider comprising:

a first slide surface having the same level throughout its length and facing the recording medium and sliding at a first distance from a plane of rotation of said recording medium, said first slide surface having a first edge, and said magnetic core situated in said first slide surface;

a second slide surface having the same level throughout its length and equal to the length of said first slide surface, said second slide surface facing the recording medium and spaced from said first slide surface by a recess, said second slide surface throughout its length sliding at a second distance from the plane of rotation of said recording medium, wherein said second distance is larger than said first distance to thereby create a positive pressure between said second slide surface and said magnetic recording medium so as to prevent said magnetic recording medium from colliding with said first edge of said first slide surface when said magnetic head slider assembly moves in a direction perpendicular to direction of rotation of said recording medium;

wherein said first edge of said first slide surface faces said second slide surface, said second slide surface includes a second edge facing away from said first slide surface, and wherein said first edge being sharper than said second edge.

2. The magnetic head slider assembly of claim 1, further comprising a third slide surface facing the recording medium and spaced from said first slide surface by a second recess at a position opposite to said second slide surface.

3. An assembly as claimed in claim 2, wherein said first slide surface and said third slide surface slide at the same distance from the plane and rotation of said recording medium.

4. An assembly as claimed in claim 3, further comprising a first air groove formed between said first slide surface and said second slide surface, and a second air groove formed between said third slide surface and said first slide surface.

5. An assembly as claimed in claim 4, further comprising a fourth slide surface having a sliding portion facing the recording medium and spaced from said third slide surface at a position opposite to said first slide surface.

6. An assembly as claimed in claim 5, further comprising a third air groove formed between said third slide surface and said fourth slide surface.

* * * * *